US005893814A

United States Patent [19]

Kiyosawa

[11] Patent Number: 5,893,814

[45] Date of Patent: Apr. 13, 1999

[54] ROTATIONAL POWER TRANSMISSION DEVICE HAVING PLANETARY GEARS

[75] Inventor: Yoshihide Kiyosawa, Nagano-ken, Japan

[73] Assignee: Harmonic Drive Systems Inc., Tokyo, Japan

[21] Appl. No.: 09/075,828

[22] Filed: May 12, 1998

[30] Foreign Application Priority Data

May 13, 1997 [JP] Japan .................................. 9-121816

[51] Int. Cl.[6] ........................................ F16H 3/44

[52] U.S. Cl. ................................ 475/325; 475/339

[58] Field of Search ......................... 475/323, 325, 475/339

[56] References Cited

U.S. PATENT DOCUMENTS

| | | | |
|---|---|---|---|
| 2,270,581 | 1/1942 | Clarke | 475/325 X |
| 2,682,177 | 6/1954 | Kelbel | 475/325 X |
| 3,780,601 | 12/1973 | Dach et al. | 475/325 |
| 5,495,778 | 3/1996 | Mochizuki | 475/325 X |
| 5,759,130 | 6/1998 | Woytaszek | 475/339 |

*Primary Examiner*—Charles A. Marmor
*Assistant Examiner*—Sherry Lynn Estremsky
*Attorney, Agent, or Firm*—Rosenthal & Osha LLP

[57] ABSTRACT

A rotational power transmission device 1 has a rotational input shaft 3, rotational input to which is transferred, via a sun gear 4 (the number of teeth is Za) and first planetary gears 5 (Zb), to second planetary gears 6 (Zc). The first and second planetary gears 5, 6 are mounted on a common planetary carrier 7. Planetary shafts 6a of the second planetary gears 6 also support third planetary gears 8 (Zd), and rotation of the second planetary gear 6 is transferred directly to the third planetary gears 8. The rotation of the third planetary gears 8 is transferred via an external gear 9 (Ze) to a rotational output shaft 11. The common planetary carrier 7 can be connected and disconnected to the input shaft 3 by means of a clutch means 12 and a clutch brake 13. The relationship of the numbers of teeth of the respective gears are Za/Zc=Ze/Zd, the normal and reverse rotations at an equal speed can be obtained from the output shaft 11.

3 Claims, 1 Drawing Sheet

ROTATIONAL POWER TRANSMISSION DEVICE HAVING PLANETARY GEARS

BACKGROUND OF THE INVENTION

1. Field of the Invention

This invention relates to a rotational power transmission device having planetary gears, and in particular to a rotational power transmission device that is able to selectively output normal and reverse rotations at an equal speed from a rotational output shaft arranged coaxially with a rotational input shaft.

2. Prior Art Description

There has known a rotational power transmission device that has rotational input and output shafts arranged coaxially and is constituted so that rotational output of normal and reverse directions can be obtained from the rotational output shaft. Typically, this type of device has a gear train associated with a clutch mechanism for changing the rotational direction of input rotation.

An object of this invention is to provide a rotational power transmission device having the above function by making use of planetary gears in a manner that it is constituted compact in structure.

SUMMARY OF THE INVENTION

In order to realize the above and other objects and advantages, according to this invention, there is provided a rotational power transmission device having planetary gears, which comprises:

- a rotational input shaft;
- a sun gear coaxially fixed on the rotational input shaft;
- at least one first planetary gear arranged radially outside the sun gear and meshed therewith;
- at least one second planetary gear arranged radially outside the first planetary gear with respect to the sun gear and meshed with the first planetary gear;
- a common planetary carrier for supporting the first and second planetary gears in a manner that they are rotatable on their axes and integrally rotatable around the sun gear;
- a third planetary gear having a planetary shaft common to the second planetary gear;
- a hollow-type rotational output shaft arranged coaxially with the rotational input shaft which has an external gear meshed with the third planetary gear;
- a clutch means for shifting the common planetary carrier between a connected mode wherein the common planetary carrier is rotated integrally with the rotational input shaft and a disconnected mode wherein it is disconnected from the rotational input shaft; and,
- a clutch braking means for maintaining the common planetary carrier in a stationary condition so as not to rotate.

In a preferred embodiment, the rotational power transmission device having planetary gears has a plurality of the first, second and third planetary gears, and more preferably the number of the first, second and third planetary gears are the same.

In another preferred embodiment, the rotational power transmission device having planetary gears satisfies the following relationship:

$$Za/Zc=Ze/Zd$$

wherein,

Za is the number of teeth of the sun gear,

Zb is that of the first planetary gear,

Zc is that of the second planetary gear,

Zd is that of the third planetary gear, and

Ze is that of the external gear.

DETAILED DESCRIPTION OF THE PREFERRED EMBODIMENT

Figure 1:
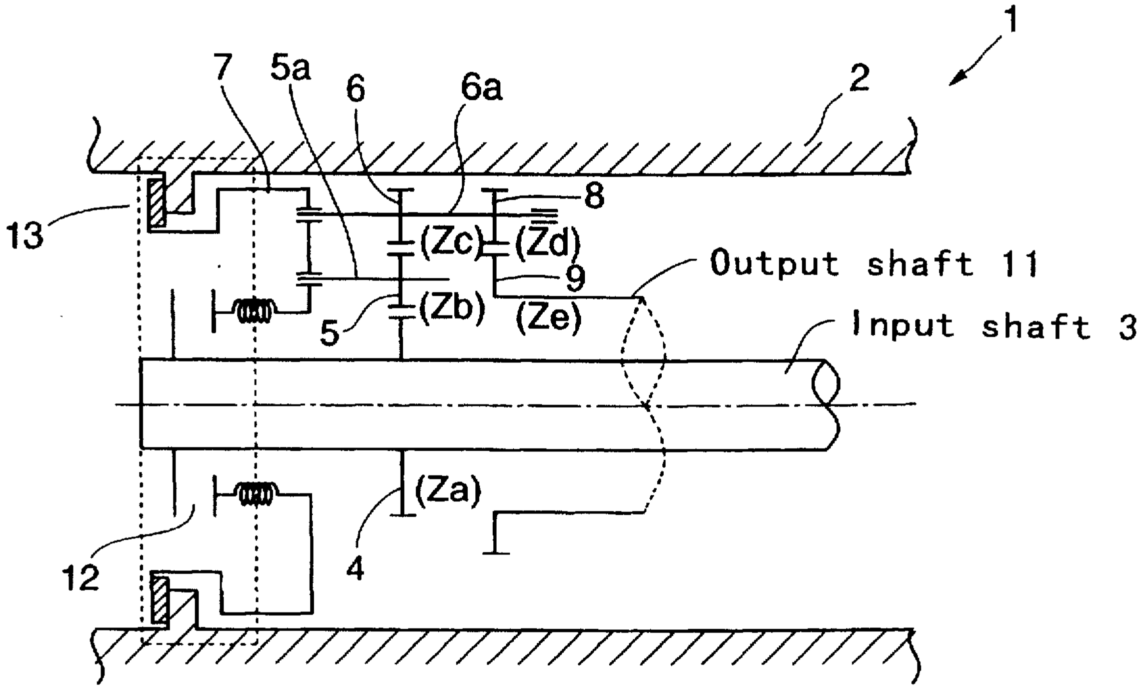
FIG. 1 is a schematic view of a rotational power transmission device according to this invention.

Referring now to FIG. 1, an example of a rotational power transmission device according to this invention will be described.

A rotational power transmission device 1 has an annular housing 2 and a rotational input shaft 3 arranged inside and supported rotatably on the housing 2. On the outer circumferential surface of the rotational input shaft 3 is integrally formed a sun gear 4, around which a plurality of first planetary gears 5 are arranged concentrically and are meshed with the sun gear 4. The same number of second planetary gears 6 are arranged concentrically around the first planetary gears 5, and the respective second planetary gears 6 are meshed with the corresponding first planetary gears 5.

The first and second planetary gears 5 and 6 are mounted on a common planetary carrier 7. More specifically, planetary shafts 5*a* of the first planetary gears 5 are mounted rotatably on the common planetary carrier 7, and planetary shafts 6*a* of the second planetary gears 6 are also mounted on the common planetary carrier 7 at positions radially outside the corresponding planetary shafts 5*a*.

The respective planetary shafts 6*a* of the second planetary gears 6 have shaft portions extending opposite to the common carrier 7 on which third planetary gears 8 are mounted, respectively. The third planetary gears 8 rotate on their axes according to the second planetary gears 6, and at the same time, around the sun gear 4 by means of the common planetary carrier 7.

The rotational power transmission device 1 also has a hollow-type rotational output shaft 11 which is arranged coaxially around the rotational input shaft 3. The rotational output shaft 11 is also supported rotatably on the housing 2. The rotational output shaft 11 is formed on its outer circumferential surface facing the third planetary gears 8 with an external gear 9 that meshes with the third planetary gears 8.

On the other hand, a clutch means 12 such as an electromagnetic clutch mechanism is located between the common planetary carrier 7 and the rotational input shaft 3. In this example, when the clutch means 12 is off, the common planetary carrier 7 is in a mode disconnected from the rotational input shaft 3, while when it is turned on, the common planetary carrier 7 becomes connected to the rotational input shaft 3 and is rotated thereby. In responsive to on and off operation of the clutch means 12, a clutch brake 13 is driven in a reverse manner. Namely, turning-on of the clutch means 12 causes the clutch brake 13 to turn off, and the common planetary carrier 7 is able to rotate freely. While, when the clutch means 12 is turned off, the clutch brake 13 is made turned on, whereby the common planetary carrier 7 is shifted to a stationary mode wherein it is fixed to the housing 2 so as not to rotate.

In the rotational power transmission device 1 as constituted above, the clutch means 12 and the clutch brake 13 responsive thereto are driven to thereby change the rotational direction of input rotation from the rotational input shaft 3 between the normal and reverse directions, and the obtained rotation is output from the rotational output shaft 11.

In order to obtain an output rotation having the same rotational speed as that of the rotational input, the number of teeth of each of the gears is selected as follows.

$$Za/Zc=Ze/Zd$$

wherein

Za is the number of teeth of the sun gear 4,

Zb is that of the first planetary gears 5,

Zc is that of the second planetary gears 6,

Zd is that of the third planetary gears 8, and

Ze is that of the external gear 9.

In addition, where the gears are a non profile-shifted gear, the pitch circle diameters of the respective gears are determined so as to satisfy the following relationship.

$$m1\ \{(Za/2)+Zb+(Zc/2)\}=\{(Zc/2)+(Zd/2)\}m2$$

As explained above, according to the rotational power transmission device of this invention, the first and second planetary gears are mounted on the common planetary carrier in a manner that they are rotatable on their axes and around the sun gear, and the second and third planetary gears have the common planetary shafts, whereby it can realize a compact mechanism for obtaining normal an reverse rotations at an equal speed from the rotational output shaft arranged coaxially with the rotational input shaft.

What is claimed is:

1. A rotational power transmission device having planetary gears, which comprises:

a rotational input shaft;

a sun gear coaxially fixed on the rotational input shaft;

at least one first planetary gear arranged radially outside the sun gear and meshed therewith;

at least one second planetary gear arranged radially outside the first planetary gear with respect to the sun gear and meshed with the first planetary gear;

a common planetary carrier for supporting the first and second planetary gears in a manner that they are rotatable on their axes and integrally rotatable around the sun gear;

at least one third planetary gear having a planetary shaft common to the second planetary gear;

a hollow rotational output shaft arranged coaxially with the rotational input shaft which has an external gear meshed with the third planetary gear;

a clutch means for shifting the common planetary carrier between a connected mode wherein the common planetary carrier is rotatable integrally with the rotational input shaft and a disconnected mode wherein it is disconnected from the rotational input shaft; and, a clutch braking means for maintaining the common planetary carrier in a stationary condition so as not to rotate.

2. A rotational power transmission device having planetary gears as set forth in claim 1, wherein a plurality of the first, second and third planetary gears are arranged, and wherein the numbers of the first, second and third planetary gears are the same with respect to one another.

3. A rotational power transmission device having planetary gears as set forth in claim 1 or 2, wherein the sun gear, the first, second, and third planetary gears, and the external gear satisfy $$Za/Zc=Ze/Zd$$

wherein

Za is the number of teeth of the sun gear,

Zb is that of the first planetary gear,

Zc is that of the second planetary gear,

Zd is that of the third planetary gear, and

Ze is that of the external gear.

* * * * *